United States Patent [19]

Matthews

[11] Patent Number: 5,265,133

[45] Date of Patent: Nov. 23, 1993

[54] NUCLEAR FUEL CONTAINER

[75] Inventor: Harry Matthews, Worsley, United Kingdom

[73] Assignee: British Nuclear Fuels plc, Cheshire, England

[21] Appl. No.: 915,177

[22] Filed: Jul. 20, 1992

[30] Foreign Application Priority Data

Jul. 18, 1991 [GB] United Kingdom ................. 9115551
Jan. 21, 1992 [GB] United Kingdom ................. 9201249

[51] Int. Cl.$^5$ .................................................. G21C 19/06
[52] U.S. Cl. ........................................................ 376/272
[58] Field of Search ............................... 376/272, 250; 250/507.1, 506.1

[56] References Cited

U.S. PATENT DOCUMENTS

| 4,016,749 | 4/1977 | Wachter | 376/272 |
|---|---|---|---|
| 4,152,585 | 5/1979 | Myers | 376/272 |
| 4,171,002 | 10/1979 | Smith | 376/272 |
| 4,197,467 | 4/1980 | Williams | 376/272 |
| 4,427,893 | 1/1984 | Queiser et al. | 376/272 |
| 4,622,203 | 11/1986 | Ellcock | 376/272 |
| 4,780,269 | 10/1988 | Fischer et al. | 376/272 |
| 4,889,681 | 12/1989 | Wachter et al. | 376/272 |
| 4,893,022 | 1/1990 | Hall et al. | 376/272 |

FOREIGN PATENT DOCUMENTS

| 0078107 | 5/1983 | European Pat. Off. . |
|---|---|---|
| 2743453 | 3/1979 | Fed. Rep. of Germany . |
| 2368123 | 5/1978 | France . |
| 986344 | 3/1965 | United Kingdom . |
| 1311069 | 3/1973 | United Kingdom . |
| 2108036A | 5/1983 | United Kingdom . |

OTHER PUBLICATIONS

Database WPIL, Week 7940, Derwent Publications Ltd., London, GB; AN 793398 and SE-A-7 807 592 (ASEA-ATOM AB) Jun. 18, 1979.

Primary Examiner—Daniel D. Wasil
Attorney, Agent, or Firm—Nixon & Vanderhye

[57] ABSTRACT

A container for nuclear fuel comprises a number of cells for receiving the nuclear fuel. The cells have removable lids and are disposed in a progressive manner in a parallel series relationship. A vent is provided between adjacent cells and an inlet for a pressurizing gas is located at the first cell. A valve at the last cell allows fluid to be discharged from that cell.

11 Claims, 4 Drawing Sheets

NUCLEAR FUEL CONTAINER

This invention relates to a nuclear fuel container, and more particularly but not exclusively, to a nuclear fuel container for containing irradiated nuclear fuel assemblies.

According to a first aspect of the present invention there is provided a container for nuclear fuel, the container comprising a plurality of cells for receiving the nuclear fuel, the cells having removable lids and being disposed in a progressive manner in a parallel series relationship, vent means between adjacent cells, inlet means for introducing a pressurizing gas into the first said cell, and valve means for discharge of fluid from the last said cell.

Preferably, at least some of the cells are each arranged to contain an assembly of nuclear fuel.

Advantageously, the vent means is located near the top of said adjacent cells, and extends lower into the first said adjacent cell than in the second said adjacent cell so as to produce a ullage space at the top of the first said adjacent cell under the effect of the pressurizing gas. Desirably, a pressure sensing means is located at or near the top of the first said cell, and may be in the lid of the first said cell. The valve means may be located in the lid of the last said cell.

Each said cell may define a plurality of compartments for containing the nuclear fuel, the compartments being disposed in parallel array. Desirably, flow means are provided between adjacent said compartments.

The invention also includes in a second aspect a method of loading the container of the first aspect of the invention, the method comprising, a) locating the container with the lids removed in a volume of liquid and below the surface of the liquid;
b) loading nuclear fuel into the first said cell;
c) closing the lid of the first said cell;
d) applying a pressurizing gas to the inlet means so as to displace the liquid from the first said cell through the respective vent means and create a ullage space at the top of the first said cell;
e) loading nuclear fuel into the next said cell;
f) closing the lid of the next said cell, applying the pressurizing gas to the inlet means so as to displace liquid from the next said cell through the respective vent means and create a ullage space at the top of the next said cell;
g) continuing in a progressive manner to load nuclear fuel into adjacent said cells, closing the lids thereof, and applying the pressurizing gas to the inlet means, until all the required said cells contain nuclear fuel.

One advantage of the invention is that gas pockets, or ullage spaces, are provided beneath the lids of the container which inhibit leakage of liquid from the container into the volume of liquid. Such an advantage also accrues with a container having only a single cell and a single lid. Hence, in a third aspect there is provided a container comprising a cell for the underwater storage of irradiated nuclear fuel elements therein, the cell being sealingly closable by a removable lid, and housing an array of elongate channels to accommodate irradiated nuclear fuel elements, and an orifice in a wall of the cell for introducing a gas supply to form and maintain a gas pocket beneath the lid.

The invention will now be further described by way of example only with reference to the accompanying drawings, in which.

Figure 1:
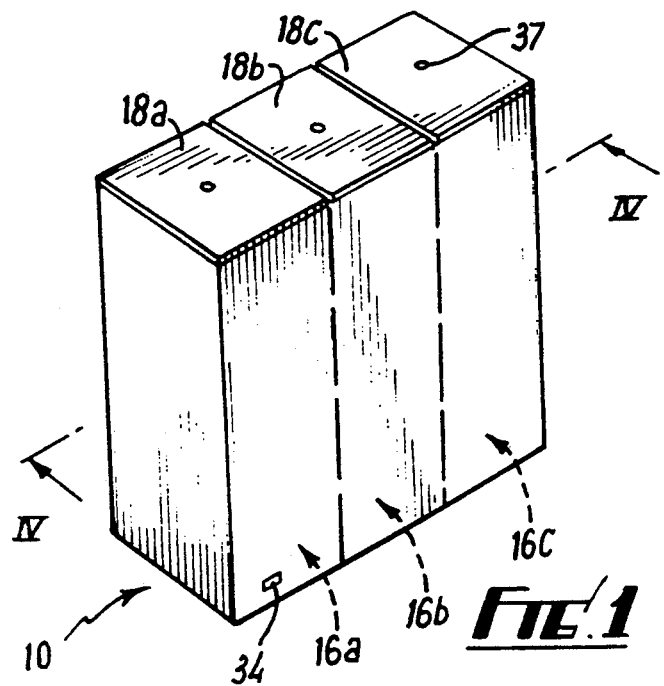
FIGS. 1 to 3 show diagrammatic perspective representations of containers.
Figure 2:
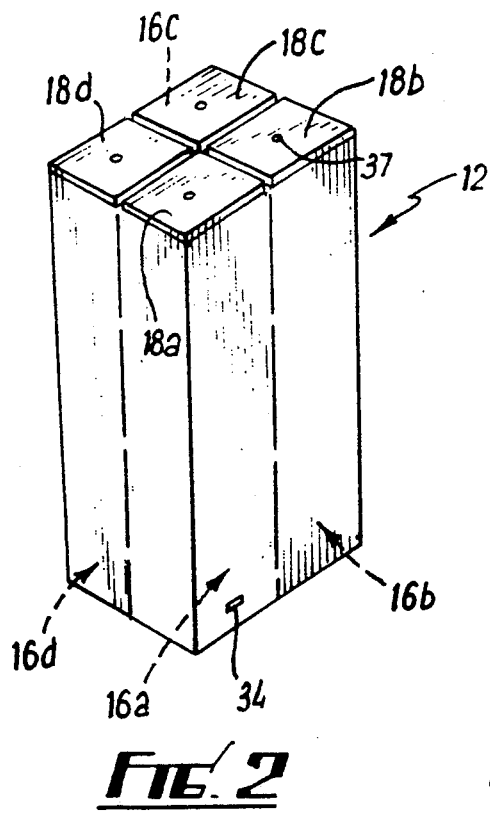
Figure 3:
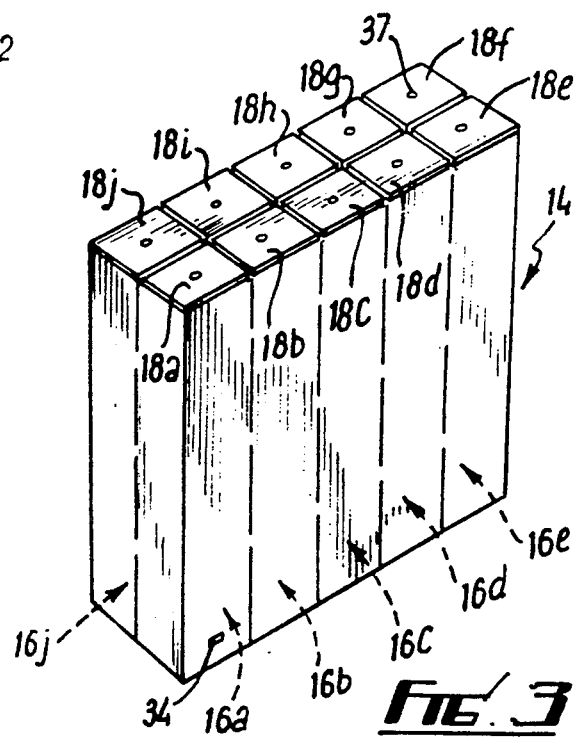

Referring now to FIGS. 1 to 3, examples of containers 10, 12, 14 for nuclear fuel are shown, each container 10, 12, 14 having a number of cells 16a-16n with a respective lid 18a-18n disposed in parallel relationship. The container 10 has three cells 16a-16c, the container 12 has four cells 16a-16d, and the container 14 has ten cells 16a-16j (not all the cells are shown).

Figure 4:
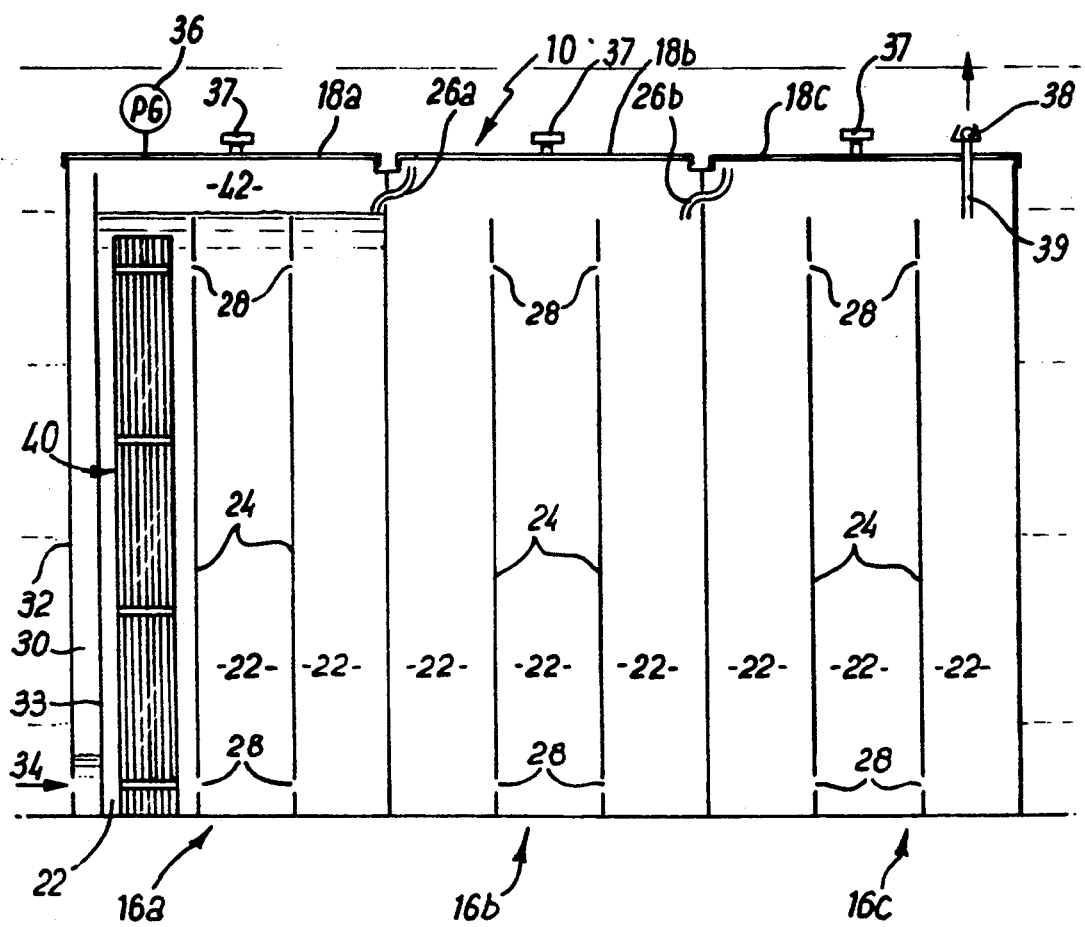
FIG. 4 shows to an enlarged scale a diagrammatic representation of a container on the line IV—IV of FIG. 3 and located in a water-filled pond.

As shown in FIG. 4, each cell 16a-16c is sub-divided into three compartments 22 by upright walls 24 which terminate at about the height at which vents 26a and 26b extend upwardly into adjacent cells 16b, 16c respectively. The walls 24 have orifices 28 to allow flow between adjacent compartments 22 in a cell 16a, or 16b, or 16c. A gas pressure space 30 is defined by a wall 33 between an end wall 32 of the cell 16a and an adjacent compartment 22, and has a gas inlet 34 from the end wall 32. The wall 33 terminates above the adjacent wall 24. The lid 18a is provided with a pressure gauge 36 for indicating pressure inside the cell 16a and thereby the level of water in the cell 16a, and the lid 18c has a self-sealing coupling 38 connected to a dip-tube 39 extending below the lid 18c. A respective attachment 37 is fitted to each lid 18a-18c to assist in removal and replacement of the lid 18a-18c.

In operation, the container 10 is located in a water filled pond 13 below the surface 15 and with the lids 18a, 18b, 18c removed. Nuclear fuel assemblies 40 (only one is shown) are loaded into the compartments 22 of the cell 16a. The lid 18a is closed, and a gas source (not shown) is connected to the gas inlet 34 to introduce a pressurized gas into the cell 16a. This causes water to be displaced from the cell 16a through the vent 26a and leave a ullage space 42. This loading procedure is repeated in cell 16b and 16c to leave a ullage space (not shown) in the respective cell 16b, 16c, although in cell 16c water is discharged through the dip-tube 39 and the self-sealing coupling 38 to leave the ullage space in the cell 16c. A flexible pipe connection (not shown) may be made to the self-sealing coupling 38 and through which water from the cell 16c may be discharged outside to the pond 13.

One of the advantages of the containers of FIGS. 1 to 4 is that removal of nuclear fuel under water from any one cell should not destroy the ullage space in adjacent cells. Radiolytic gases that might be generated from the nuclear fuel in any one cell would be transferred by pressure balancing along the series of cells until eventually being discharged through the aperture 34 if all the lids remained closed.

It will be appreciated that the containers 12 and 14 may be loaded with nuclear fuel in a similar manner to that described in relation to the container 10.

Figure 5:
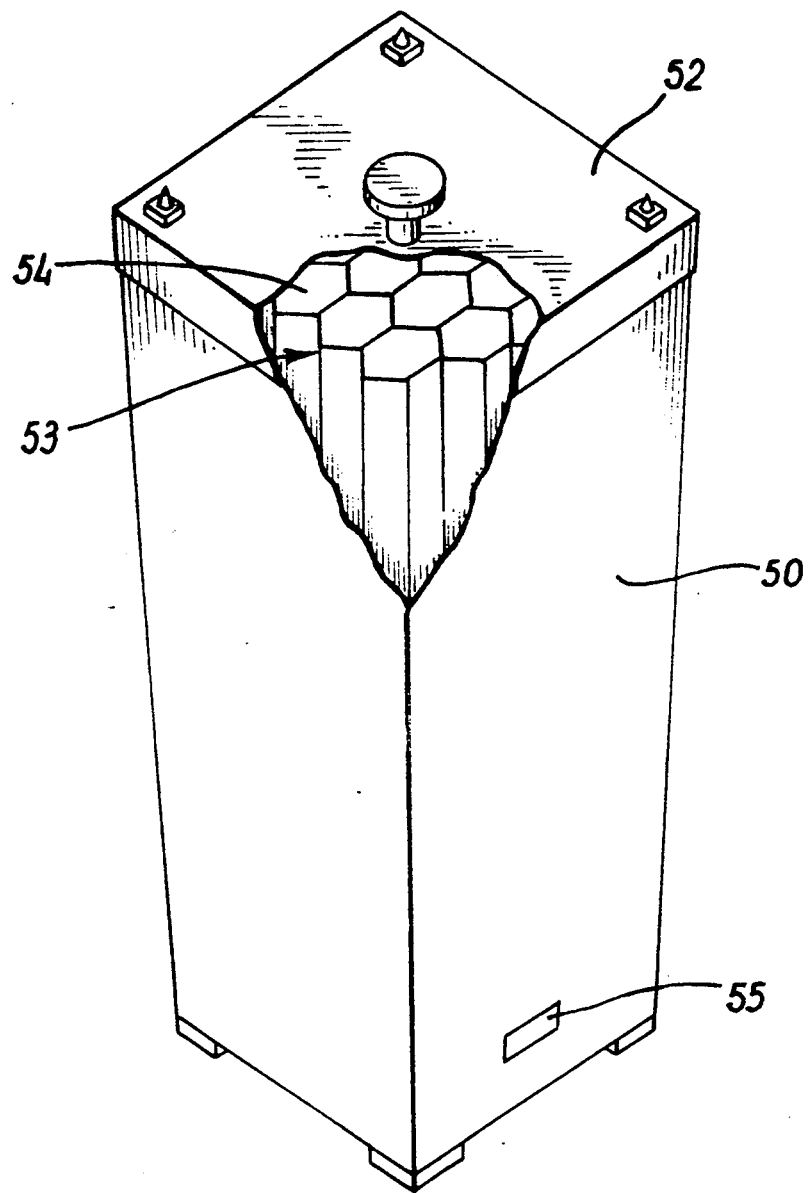
FIG. 5 shows a diagrammatic perspective representation of an alternative container.
Figure 6:
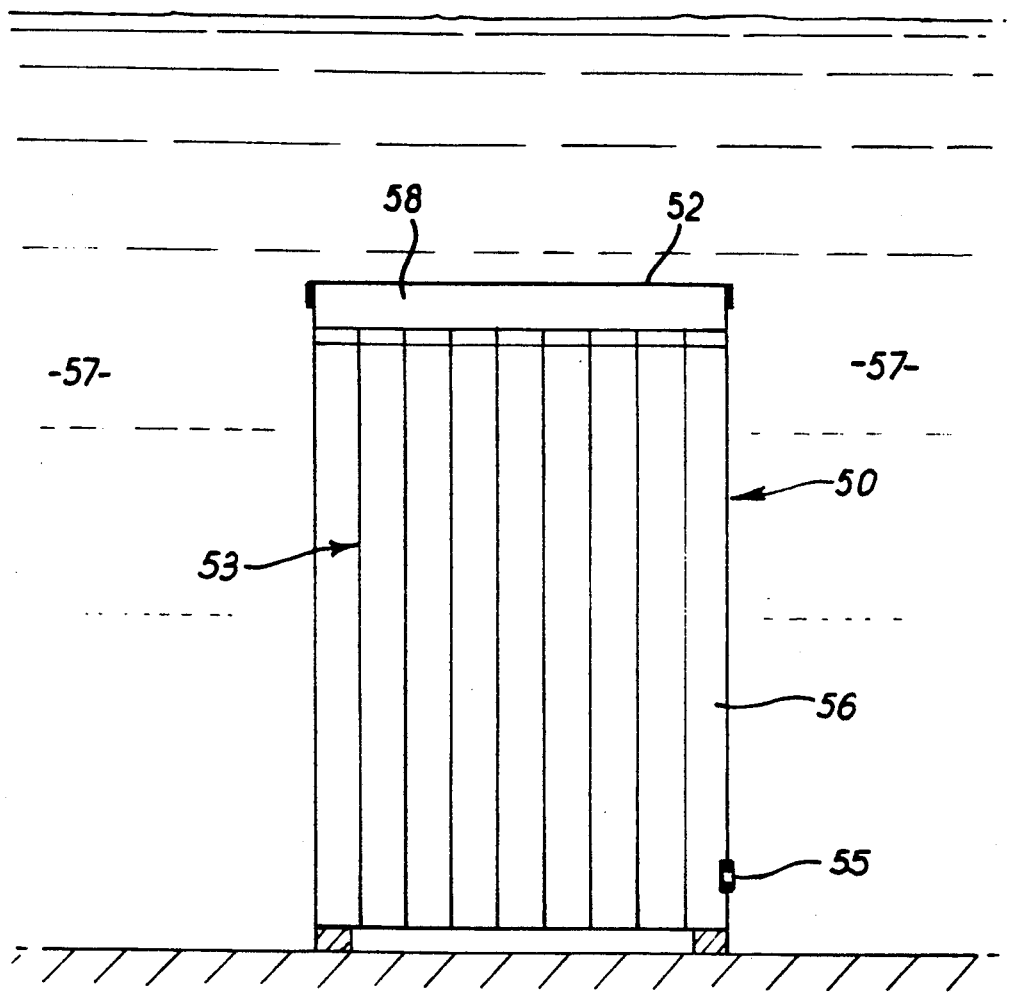
FIG. 6 is a diagrammatic view on the line VI—VI of FIG. 5.

Containers having alternative numbers of cells may be used, and alternative numbers of compartments. For example, as shown in FIGS. 5 and 6 a container 50 is sealingly closed by a removable lid 52. Preferably as shown in FIG. 5 the container 50 is rectangular in section and both the container 50 and the lid 52 can be formed from stainless steel.

An array of channels 53 to receive fuel elements (not shown) is disposed within the container 50, the height or length of the array being less than that of the container 50 so as to leaves a gap 54 beneath the lid 52. An orifice 55 at a lower region in a wall of the container 50 communicates directly with the adjacent channel 56 of the array of channels 53.

A gas supply (not shown) can be introduced through the orifice 55, and conveniently the gas supply is nitrogen.

In use, the container 50 is lowered into and immersed in the water of a storage pond 57. With the lid 52 removed, irradiated nuclear fuel elements are introduced into the channels 53 of the array with the exception of the channel 56. After loading with the fuel elements, the lid 52 is located on the container 50.

With time the water within the container 50 becomes highly radioactive and it is possible that this water could leak into the water in the pond 57 through deterioration of the seal at the lid 52. Such leakage is to be avoided as it poses a health and safety hazard.

Accordingly, immediately after loading the irradiated fuel elements into the container 50, gas is introduced through the orifice 55 into the container 50. The gas is preferably nitrogen. The gas displaces water from the interior of the container 50 and the level of the water drops within the container 50. The water from the container 50 is displaced into the pond 57 by way of the orifice 55 to leave a pocket 18 of gas (nitrogen) beneath the lid 52. This gas pocket 58 isolates the seal at the lid 52 from the water in the container 50 to thereby prevent leakage of water out of the container 50. The gas is not pressurized and in order to maintain the gas pocket 58 it will be required to introduce fresh gas into the container 50 as and when necessary through the orifice 55.

I claim:

1. A container for nuclear fuel, the container comprising a plurality of cells for receiving the nuclear fuel, the improvement comprising the cells having removable lids and being disposed in a progressive manner in a parallel series relationship, vent means between adjacent cells, inlet means for introducing a pressurizing gas into the first said cell, and valve means for discharge of fluid from the last said cell.

2. A container as claimed in claim 1, wherein the vent means is located near the top of said adjacent cells and extends lower into the first said adjacent cell than in the second said adjacent cell, thereby to produce a ullage space at the top of the first said adjacent cell under the effect of the pressurizing gas.

3. A container as claimed in claim 2, wherein a pressure sensing means is located at or near the top of the first said cell.

4. A container as claimed in claim 3, wherein the pressure sensing means is in the lid of the first said cell.

5. A container as claimed in claim 2, wherein the valve means is located in the lid of the last said cell.

6. A container as claimed in claim 2, wherein each said cell defines a plurality of compartments for containing the nuclear fuel, the compartments being disposed in parallel array.

7. A container as claimed in claim 6, wherein flow means are defined between adjacent said compartments.

8. A container as claimed in claim 2 wherein the inlet means is arranged to discharge into a gas pressure space adjacent to an end wall of the first said cell.

9. A container as claimed in claim 2, wherein at least some of the cells are arranged so as to contain an assembly of nuclear fuel.

10. A container as claimed in claim 2, wherein the valve means comprises self-sealing coupling means.

11. A method of loading the container as claimed in claim 2, the method comprising:
   a. locating the container with the lids removed in a volume of liquid and below the surface of the liquid,
   b. loading nuclear fuel into the first said cell,
   c. closing the lid of the first said cell,
   d. applying a pressurizing gas to the inlet means so as to displace some of the liquid from the first said cell through the respective vent means and create a ullage space at the top of the first said cell,
   e. loading nuclear fuel into the next said cell,
   f. closing the lid of the next said cell, applying the pressurizing gas to the inlet means so as to displace liquid from the next said cell through the respective vent means and create a ullage space at the top of the next said cell,
   g. continuing in a progressive manner to load nuclear fuel into adjacent said cells, closing the lids thereof, and applying the pressurizing gas to the inlet means, until all the required said cells contain nuclear fuel and have a ullage space at the top thereof.

* * * * *